United States Patent
Hattori

(10) Patent No.: US 8,117,186 B2
(45) Date of Patent: Feb. 14, 2012

(54) DATABASE PROCESSING APPARATUS, INFORMATION PROCESSING METHOD, AND COMPUTER PROGRAM PRODUCT

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 463 days.

(21) Appl. No.: 12/360,271

(22) Filed: Jan. 27, 2009

(65) Prior Publication Data

US 2009/0222458 A1    Sep. 3, 2009

(30) Foreign Application Priority Data

Feb. 29, 2008 (JP) ................................ 2008-050822

(51) Int. Cl.
*G06F 7/00* (2006.01)

(52) U.S. Cl. ........ 707/714; 707/769; 707/756; 707/770; 707/774; 707/778; 707/796; 707/797; 707/798

(58) Field of Classification Search .................. 707/770, 707/774, 778, 796, 797, 798, 714, 769, 756
See application file for complete search history.

(56) References Cited

U.S. PATENT DOCUMENTS

| 2007/0027671 A1* | 2/2007 | Kanawa ............................ 704/4 |
| 2007/0130110 A1* | 6/2007 | Graefe et al. ..................... 707/2 |
| 2008/0016032 A1* | 1/2008 | Dettinger et al. ................ 707/2 |
| 2009/0132473 A1 | 5/2009 | Hattori |

OTHER PUBLICATIONS

Chistopher Re, et al, A Complete and Efficient Algebraic Compiler for XQuery, IEEE Computer Society, 2006.

* cited by examiner

*Primary Examiner* — Apu Mofiz
*Assistant Examiner* — Cindy Nguyen
(74) *Attorney, Agent, or Firm* — Turocy & Watson, LLP

(57) ABSTRACT

A database processing apparatus generates a first processing instruction for acquiring an element included in the processing-target structured document, a second processing instruction for performing a natural join by using result data including the acquired element, a third processing instruction for performing a cross join by using the result data, and a fourth processing instruction for updating a correspondence relation between a result of the execution of the natural join and a result of the execution of the cross join by using these result of executions, and joins these processing instructions to generate the process plan. At this time, the database processing apparatus converts the first processing instruction into a fifth processing instruction for transmitting an acquisition request for the element to the database servers, and receiving the result data including the acquired element from the plural database servers.

10 Claims, 17 Drawing Sheets

FIG.2

```
<book>
  <author>HATTORI</author>
  <author>TANAKA</author>
  <title>XML DATABASE</title>
  <body>XML IS ...</body>
</book>
```

FIG.3

```
for $x in //book
for $y in //book
let $z: = count(
        for $x0 in $x/author[0]
        for $y0 in $x/author[0]
        where $x0 = $y0
        return $x0
        )
return
    <books
      title1={$x/title/text()}
      title2={$y/title/text()}>
      {$z}
    </books>
```

FIG.5

```
for $x in //book
let $x0 in $x/author[0]
return $x/title, $x0
```

FIG.6

$x/title→"HT0"
$x0→"HT1"

DATABASE PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from the prior Japanese Patent Application No. 2008-50822, filed on Feb. 29, 2008; the entire contents of which are incorporated herein by reference.

BACKGROUND OF THE INVENTION

1. Field of the Invention

The present invention relates to a database processing apparatus, an information processing method, and a computer program product for processing structured documents in a distributed database having a plurality of databases distributed that store therein the structured documents having hierarchical structures.

2. Description of the Related Art

Along with recent spread of structured documents such as an extensible markup language (XML) document, databases that store therein the structured documents (for example, an XML database) are increasingly used. An XQuery and the like are proposed as languages to be used in querying these databases. The XQuery is a functional language for querying the XML database, and is characterized by FLWR syntax. The FLWR syntax contains a for clause, a let clause, a where clause, and a return clause. A process performed by using the XQuery is described in "A Complete and Efficient Algebraic Compiler for XQuery", for example.

In the FLWR syntax of the XQuery, the for clause binds each item in a sequence to a variable, whereas the let clause binds an entire sequence to a variable. Combination of the for and let clauses enables advanced queries appropriate for the XML (restructuring or compiling of the XML cannot be expressed without the let clause.)

A process for the XQuery results in a sequence. The let clause can be called a nested clause because a nested query can be invoked by using the let clause. Thus, the let clause is syntax forming the foundation of the XQuery; however, its realizing method has not been studied sufficiently. Practically, when the let clause is handled like the for clause, problems such as "loss of sequence elements" and "lack of the number of results" occur, and therefore processing thereof is difficult. The article mentioned above only refers to a processing method using FLWR samples, and a detailed processing method for the let clause is unclear.

In the existing database products, the let clauses are mostly implemented according to a processing system for functional languages. When a database is queried using the nested structure mentioned above in the implementation of the let clauses according to the processing system for functional languages, an outer XQuery and an inner XQuery of the nested structure are regarded as having an input-output relation. Therefore, upon completion of a process for the outer XQuery, obtained results of the process are passed on to the inner XQuery as variables, and processes for the variables are then performed.

The let clause or nested clause is essential to perform an advanced process of the XQuery. There are few processing methods corresponding to the processing system for functional languages. When these processing methods are used, problems as mentioned below occur. Particularly, the amount of calculation increases in an XQuery including double or more for and nested clauses. In such XQuery, an inner loop is processed upon completion of processes for outer multiple loops. That is, a nested function is invoked by the number of multiple loops. In a practical processing system having ordering restrictions on nested functions, the problem is overcome by rewriting an XQuery, a program, or the like.

Another problem occurs in a distributed XML database in which XML data are distributed over plural database servers and a coordinator server is connected to these database servers. That is, until all the XML data are retrieved from the database servers using an upper for clause, a lower nested clause cannot be processed. The coordinator server needs to receive all data lower than the corresponding XML elements included in the database servers. When the XML elements included in the database are large in number or size, the cost required for transferring the elements becomes quite high.

As described above, when a distributed XML database is queried using a nested structure, processes thereof can be complicated, resulting in increases in the quantity of data to be transferred and the amount of calculation, and therefore performance of the database can be significantly deteriorated.

SUMMARY OF THE INVENTION

According to one aspect of the present invention, a database processing apparatus that is connected to plural distributed database servers each having a database that stores a structured document including at least one element, the apparatus includes a receiving unit that receives a process request for requesting a process related to the structured document; a plan generating unit that generates a process plan, including processing instructions each corresponding to a unit of execution, to perform the process; a executing unit that executes each of the processing instructions included in the process plan, as a result executing-the process plan; a storage unit that stores a result of execution of each of the processing instruction in units of records; a result generating unit that generates a first structured document according to the process request by using the result of execution stored in the storage unit; and a result transmitting unit that transmits the first structured document, wherein the plan generating unit includes a first generating unit that generates at least one first processing instruction for acquiring all or part of elements included in a structured document to be processed based on the process request, a second generating unit that generates a second processing instruction for performing a natural join by using result data including the elements acquired according to the first processing instruction, a third generating unit that generates a third processing instruction for performing a cross join by using the result data, a fourth generating unit that generates a fourth processing instruction for updating a correspondence relation between a result of the natural join performed by executing the second processing instruction and a result of the cross join performed by executing the third processing instruction, based on these results, a joining unit that joins the first to fourth processing instructions, thereby generating the process plan, and a converting unit that converts the first processing instruction included in the process plan into a fifth processing instruction for transmitting at least one acquisition request for the acquisition of all or part of the elements to the database servers, and receiving result data including the elements acquired according to the acquisition request from the database servers, respectively.

According to another aspect of the present invention, a n information processing method implemented in a database processing apparatus that includes a receiving unit, a plan generating unit, a executing unit, a storage unit that stores a result of execution of each of the processing instruction in units of records, a result generating unit, and a result transmitting unit, and that is connected to plural distributed database servers each having a database that stores a structured document including at least one element, the method includes receiving a process request for requesting a process related to the structured document by the receiving unit; generating a process plan, including processing instructions each corresponding to a unit of execution by the plan generating unit, to perform the process; executing each of the processing instructions included in the process plan by the executing unit, as a result executing the process plan; generating a first structured document according to the process request by the result generating unit using the result of execution stored in the storage unit; transmitting the first structured document by the result transmitting unit; generating at least one first processing instruction for acquiring all or part of elements included in a structured document to be processed based on the process request by the plan generating unit; generating a second processing instruction for performing a natural join by the plan generating unit using result data including the elements acquired according to the first processing instruction; generating a third processing instruction for performing a cross join by the plan generating unit using the result data; generating a fourth processing instruction by the plan generating unit for updating a correspondence relation between a result of the natural join performed by executing the second processing instruction and a result of the cross join performed by executing the third processing instruction, based on these results; joining the first to fourth processing instructions by the plan generating unit, thereby generating the process plan; and converting the first processing instruction included in the process plan into a fifth processing instruction, by the plan generating unit, for transmitting at least one acquisition request for the acquisition of all or part of the elements to the database servers, and receiving result data including the elements acquired according to the acquisition request from the database servers, respectively.

A computer program product according to still another aspect of the present invention causes a computer to perform the method according to the present invention.

BRIEF DESCRIPTION OF THE DRAWINGS

FIG. 2 is a diagram illustrating an example of XML data;

FIG. 3 is a diagram illustrating an example of an XQuery;

FIG. 5 is a diagram illustrating an example of a fragmented query according to the embodiment;

FIG. 6 is a diagram illustrating an example of control data to be added to the fragmented query shown in FIG. 5;

DETAILED DESCRIPTION OF THE INVENTION

Figure 1:
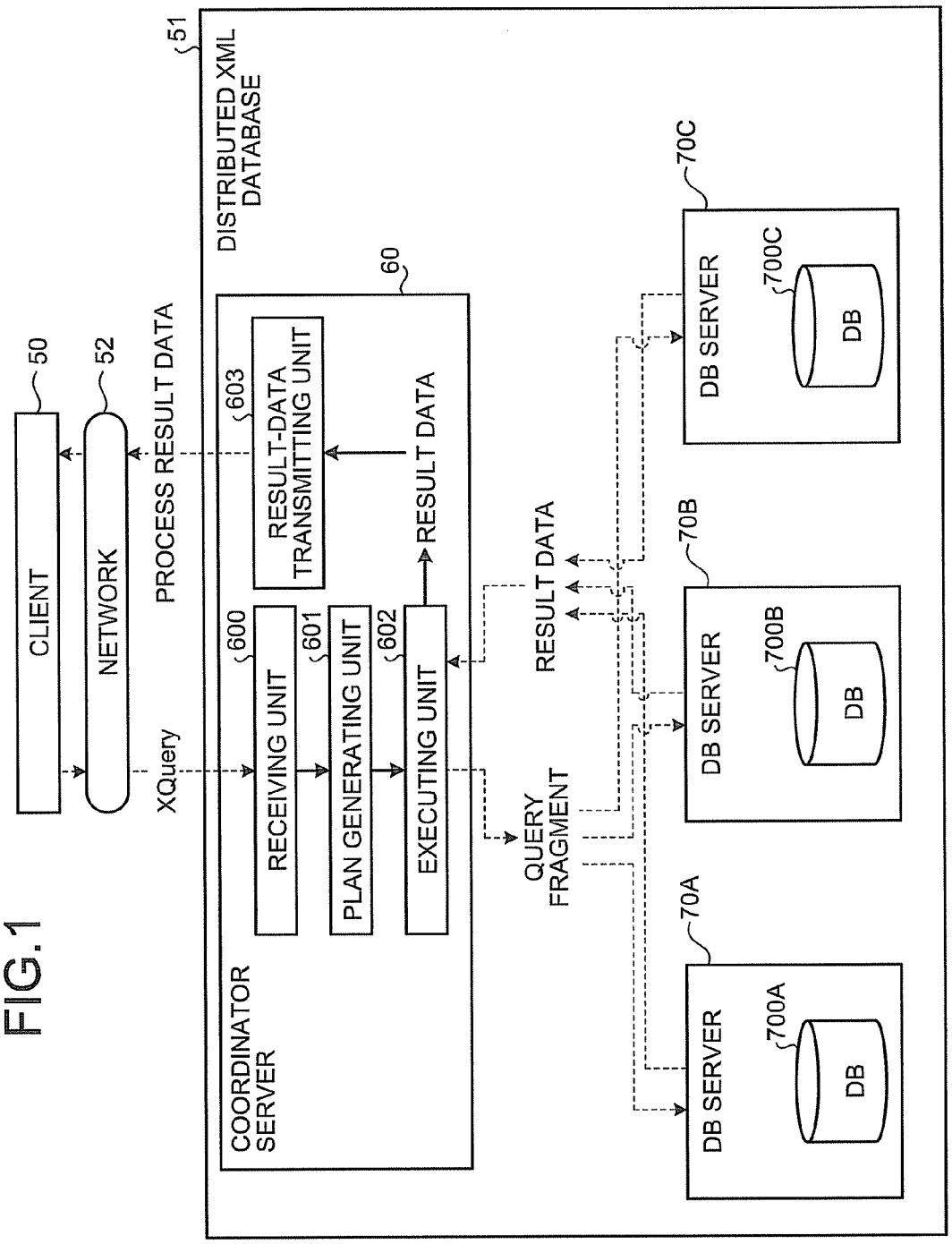
FIG. 1 is a diagram illustrating an example of a configuration of a distributed XML database system according to an embodiment of the present invention.

FIG. 1 is a diagram illustrating an example of a configuration of a distributed XML database system according to an embodiment of the present invention. The distributed XML database system includes a client computer (hereinafter, "client") 50 that executes application programs, and a distributed XML database 51, which are connected through a network 52. The distributed XML database 51 includes a coordinator server 60, and plural DB servers 70A to 70C. The network 52 is a local area network (LAN), an intranet, the Ethernet (registered trademark), or the Internet, for example.

The coordinator server 60 is connected to the client 50, and the plural DB servers 70A to 70C. The coordinator server 60 receives a process request for requesting a process from the client 50, performs the process corresponding to the process request, and transmits a result of the process to the client 50. It is assumed here that the process request received from the client 50 is expressed by an XQuery. In performing the process corresponding to the process request received from the client 50, the coordinator server 60 generates a plan including a query fragment (which is explained later), and transmits the query fragment to the DB servers 70A to 70C at execution of the plan. The coordinator server 60 then receives results of execution of the query fragment from the DB servers 70A to 70C, executes the process using the received execution results to generate process result data, and transmits the result data to the client 50.

The DB server 70A includes a DB 700A that stores therein XML data as structured documents having hierarchical structures. The DB server 70A executes the query fragment transmitted from the coordinator server 60, properly retrieves corresponding XML data from the DB 700A, and transmits the result data including the retrieved XML data to the coordinator server 60 as an execution result. The DB server 70B includes a DB 700B that stores therein XML data, and realizes the same function as that of the DB server 70A. The DB server 70C includes a DB 700C that stores therein XML data, and realizes the same function as that of the DB server 70A. The DB servers 70A to 70C are assigned with DB server numbers that enable to identify the servers, respectively. The DB server numbers assigned to the DB servers 70A to 70C are "db1" to "db3" in this order, respectively. The DB servers 70A to 70C are hereinafter referred to simply as "DB server 70" when they are not to be distinguished, and the DBs 700A to 700C are referred to simply as "DB 700" when they are not to be distinguished.

The client 50, the coordinator server 60, and the DB servers 70 each include a controller such as a central processing unit (CPU) that controls the entire apparatus, storages that store therein various data and programs such as a read only memory (ROM) and a random access memory (RAM), and an external storage that stores therein various data and programs such as a hard disk drive (HDD) and a compact disk (CD) drive. The client 50, the coordinator server 60, and the DB servers 70 each further include a display that displays information such as a display unit, an input device that enables a user to input various process requests such as a keyboard and a mouse, and a communication controller that establishes communications with an external computer through the network 52. The client 50, the coordinator server 60, and the DB servers 70 each include a bus for connecting these components, and have a hardware configuration using a normal computer. In this configuration, the DB 700 is stored in the external storage of the DB server 70. However, the DB 700 can be stored in the storage of the DB server 70 such as a RAM.

Various functions that are realized in this hardware configuration by the coordinator server 60 executing the various programs stored in the storage or the external storage are explained. Components as entities of the various functions realized by the coordinator server 60 are explained below. The coordinator server 60 includes a receiving unit 600, a plan generating unit 601, a executing unit 602, and a result-data transmitting unit 603.

The receiving unit 600 receives a process request (XQuery) transmitted from the client 50. The plan generating unit 601 analyzes the XQuery received by the receiving unit 600, and generates a plan including a query fragment according to a result of the analysis. The executing unit 602 executes the plan generated by the plan generating unit 601, and generates XML data according to the XQuery transmitted from the client 50 as process result data. In the execution of the plan, the executing unit 602 transmits the query fragment to the DB servers 70A to 70C, receives results of execution of the query fragment from the DB servers 70A to 70C, and executes the process using the received execution results to generate the process result data. The result-data transmitting unit 603 transmits the process result data generated by the executing unit 602 to the client 50.

The XML data has a document structure including at least one element hierarchized, which is a structured document in which each element is described using a tag. FIG. 2 is a diagram illustrating an example of the XML data. As shown in FIG. 2, in the XML data, one element is expressed by data sandwiched by two tags, that is, a tag (start tag) indicating a start of the element and a tag (end tag) indicating an end of the element. In the XML data shown in FIG. 2, data indicating a head author of a document is sandwiched by tags <author>, data indicating the title is sandwiched by tags <title>, and data indicating the body of the document is sandwiched by tags <body>. Text data sandwiched by the start and end tags is a text element (text node) included in one element expressed by the start and end tags.

The XQuery is explained. The XQuery is a functional language for querying a database (XML database) that stores therein the XML data, and is characterized by a FLWOR (for-let-where-return) syntax using the for clause, the let clause, the where clause, and the return clause. A query language for a relational database (RDB) is a structured query language (SQL), which is a declarative language, while the XQuery has many characteristics as the functional language.

A language specification of the XQuery is explained in procedural terms. The for clause has a syntax of "for variable in expression". The syntax of the for clause represents a loop that is formed by assigning a value satisfying the expression to the variable. The let clause has a syntax of "let variable:=expression". The syntax of the let clause represents that values satisfying the expression are aggregated and assigned to the variable as a sequence, which is a flat list. The where clause limits the loop repeated in the for clause. The where clause has a syntax of "where expression". The syntax of the where clause represents that a loop is repeated only for values that satisfy the expression whereas the loop is skipped otherwise. The return clause is for formatting a result of the process for the XQuery. The return clause has a syntax of "return expression". The syntax of the return clause can describe arbitrary XML data including a variable. A variable has a syntax of "$ character string". Variables having the same character string are regarded as identical unless redeclared in a nested query or the like.

There are following path operators (PTH) for specifying hierarchical conditions between elements of the XML data in the XQuery:

"/": Path operator indicating that elements have a parent-child relation

"//": Path operator indicating that elements have an ancestor-descendant relation ".": Arbitrary element FIG. 3 is a diagram illustrating an example of the XQuery. The XQuery shown in FIG. 3 requests the following: Combinations of a book (book:$x), which is a descendant of a root of a database, and a book (book:$y), which is a descendant of the root are generated. When head authors thereof (author[0]: $x0, author[0]:$y0) are equal (=) in each of the combinations, the head author is returned (return $x0), and the returns are counted (count:$z). A pair of titles (title1, title2), and the count ($z) are outputted finally.

Figure 4:
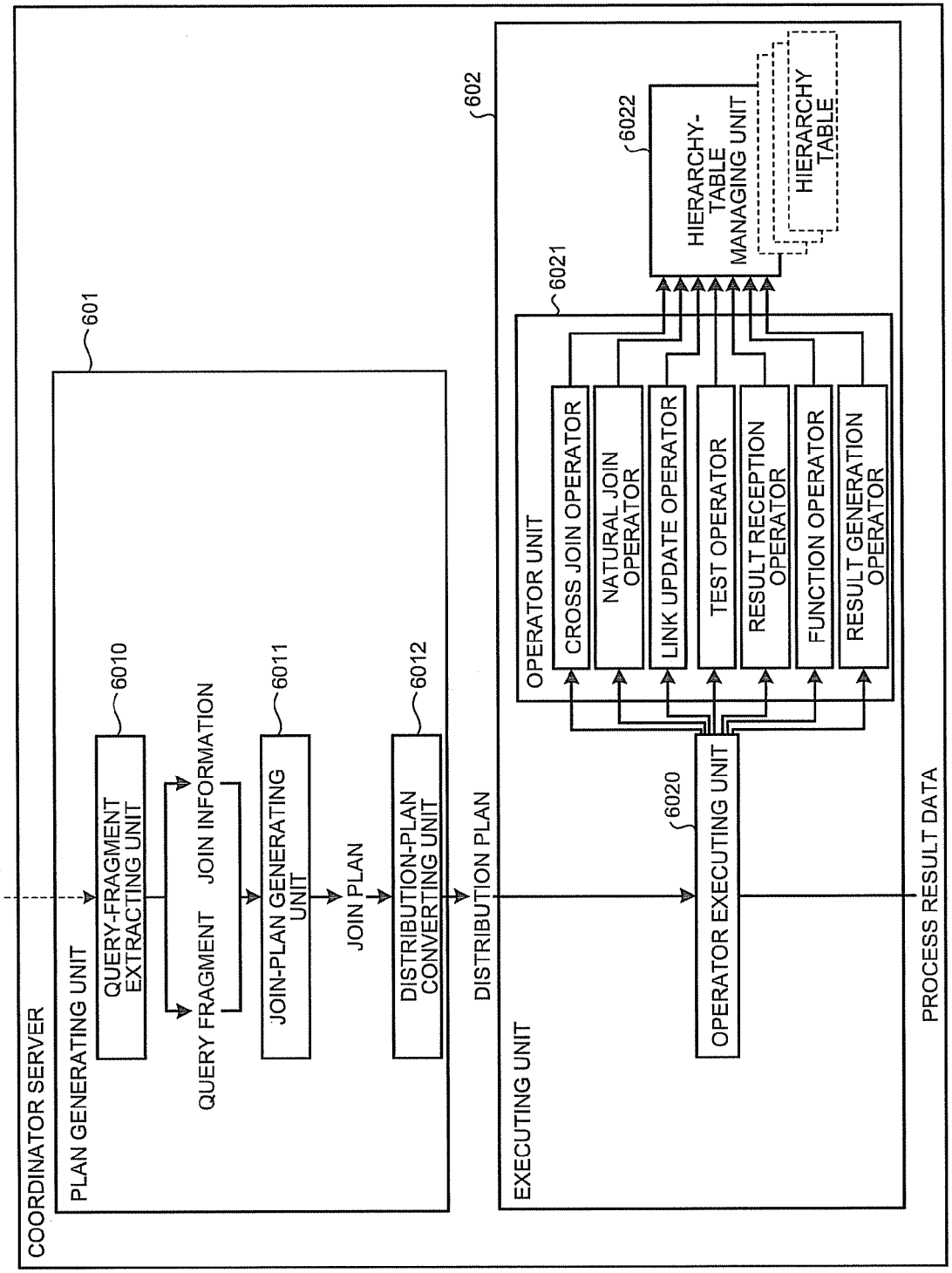
FIG. 4 is a diagram illustrating an example of a configuration of a executing unit according to the embodiment.

Detailed configurations of the plan generating unit 601 and the executing unit 602 are explained with reference to FIG. 4. The plan generating unit 601 includes a query-fragment extracting unit 6010, a join-plan generating unit 6011, and a distribution-plan converting unit 6012. The query-fragment extracting unit 6010 extracts from the XQuery, a fragmentary query (fragmented query), which is part of the query for the DB server 70. The fragmented query is data of the query of a character string expressing the XQuery, and indicates an acquisition request for requesting acquisition of all or part of elements included in the XML data. The query-fragment extracting unit 6010 sometimes extracts plural fragmented queries from one XQuery, to generate plural query fragments. That is, the query-fragment extracting unit 6010 generates at least one processing instruction including an acquisition request for acquiring all or part of elements included in the XML data, and control data (which is explained later) as a query fragment. A method for extracting the fragmented query is explained below in detail associated with an operation. The query-fragment extracting unit 6010 then adds the control data relating to transmission or reception of result data designated by the return clause in the XQuery to the extracted fragmented query, to generate a query fragment.

The control data is used for assigning a hierarchy table (which is explained later) to the DB server 70, to properly process the result data as a result of execution of the query fragment, received by the coordinator server 60 from the DB server 70. More specifically, to fragmented queries as shown in FIG. 5, the query-fragment extracting unit 6010 adds control data for assigning "HT0" to [&x/title], and adds control data for assigning "HT1" to [&x0], as shown in FIG. 6, thereby generating query fragments, for example. That is, hierarchy table names "HT0" and "HT1" specified by the control data enable to identify locations where result data indicating results of execution of the query fragments are stored in the coordinator server 60. The DB server 70 that has executed the query fragment adds a header for specifying a correspondence relation between the result data that includes elements obtained by the execution and the DB server 70 that transmits the result data, to the result data, and transmits resultant result data to the coordinator server 60. In the above example, the DB server 70 adds a header "HT0 (DB server number)" to result data to be returned in response to [&x/title], adds a header "HT1 (DB server number)" to result data to be returned in response to [$x0], and transmits resultant data to the coordinator server 60. With these headers, the coordinator server 60 can identify which one of the DB servers 70A to 70C transmits each of the result data in response to which query fragment, and in which hierarchy table each of the result data is to be stored.

The query-fragment extracting unit 6010 also extracts information for joining the query fragments, as join information. The query-fragment extracting unit 6010 sometimes extracts plural pieces of join information from one XQuery.

The join-plan generating unit 6011 generates a plan (join plan) from the query fragment extracted and generated by the query-fragment extracting unit 6010 and the join information extracted by the query-fragment extracting unit 6010.

A plan is a sequence of operators, and is normally represented by a directed inverted-tree graph having operators as nodes, except as including nested functions. An operator is an instruction having a basic function. The operators include a cross join operator, a natural join operator, a link update operator, a test operator, a result reception operator, a function operator, a result generation operator, and the like, which are explained in detail below.

The distribution-plan converting unit 6012 converts the join plan to generate a distribution plan, to cause the DB server 70 to execute part of operators. More specifically, the distribution-plan converting unit 6012 sets a result reception operator to the query fragment included in the join plan, thereby generating a distribution plan.

The executing unit 602 includes an operator executing unit 6020, an operator unit 6021, and a hierarchy-table managing unit 6022.

The hierarchy-table managing unit 6022 stores therein plural hierarchy tables corresponding to the result data transmitted from the DB server 70. The hierarchy table is a special table that uses link information to represent hierarchy based on hierarchical relations among tables. The table is equivalent to a relation in the RDB. The hierarchy table contains data in units of records, and each record has at least one column. A column is a data item. For example, a record corresponding to the XML data as shown in FIG. 2 has columns of the title, the head author, and the like. Link information that enables to uniquely identify records stored in the hierarchy table is assigned to each record. The link information includes a DB server number, and a record number. The record number is a number that enables to uniquely identify the records stored in the hierarchy table. The link information is used for link update, which is explained later. The hierarchy-table managing unit 6022 is stored in the external storage as mentioned above. However, the hierarchy-table managing unit 6022 can be temporally stored in the storage such as a RAM.

The operator executing unit 6020 invokes various operators included in the operator unit 6021 according to the distribution plan generated by the distribution-plan converting unit 6012, executes the invoked operators, and updates the hierarchy tables stored in the hierarchy-table managing unit 6022. At this time, the operator executing unit 6020 adds the link information to each record stored in the hierarchy tables. Input/output into/from the operators is performed by using a pointer of the hierarchy table or the link information. As a result, the operator executing unit 6020 outputs XML data according to the XQuery transmitted from the client 50.

The operator unit 6021 has various operators such as the cross join operator, the natural join operator, the link update operator, the test operator, the result reception operator, the function operator, and the result generation operator.

The cross join operator is an instruction for performing a cross join operation between the hierarchy tables. This operation is equivalent to a cross join operation in the RDB, and used to obtain a combination of data between the hierarchy tables. The natural join operator is an instruction for performing a natural join operation between the hierarchy tables. This operation is equivalent to a natural join operation in the RDB, and used to merge target columns having the same value between the hierarchy tables. The link update operator is an operation for two hierarchy tables having a specified hierarchical relation. The link update operator is an instruction for updating the link information by using two pieces of the link information included in the hierarchy tables. The test operator is an instruction for performing an operation of comparison of equality or inequality, and is equivalent to a selection operation in the RDB. The result reception operator is an instruction for transmitting a query fragment to the DB servers 70A to 70C, receiving result data indicating results of execution of the query fragment, and obtaining a union of the received result data. The function operator is an instruction for performing a function operation to a column having a record stored in a hierarchy table. The result generation operator is an instruction for processing data resulting from the function operation performed by the function operator into XML data, thereby generating XML data corresponding to the XQuery transmitted from the client 50.

Figure 7:
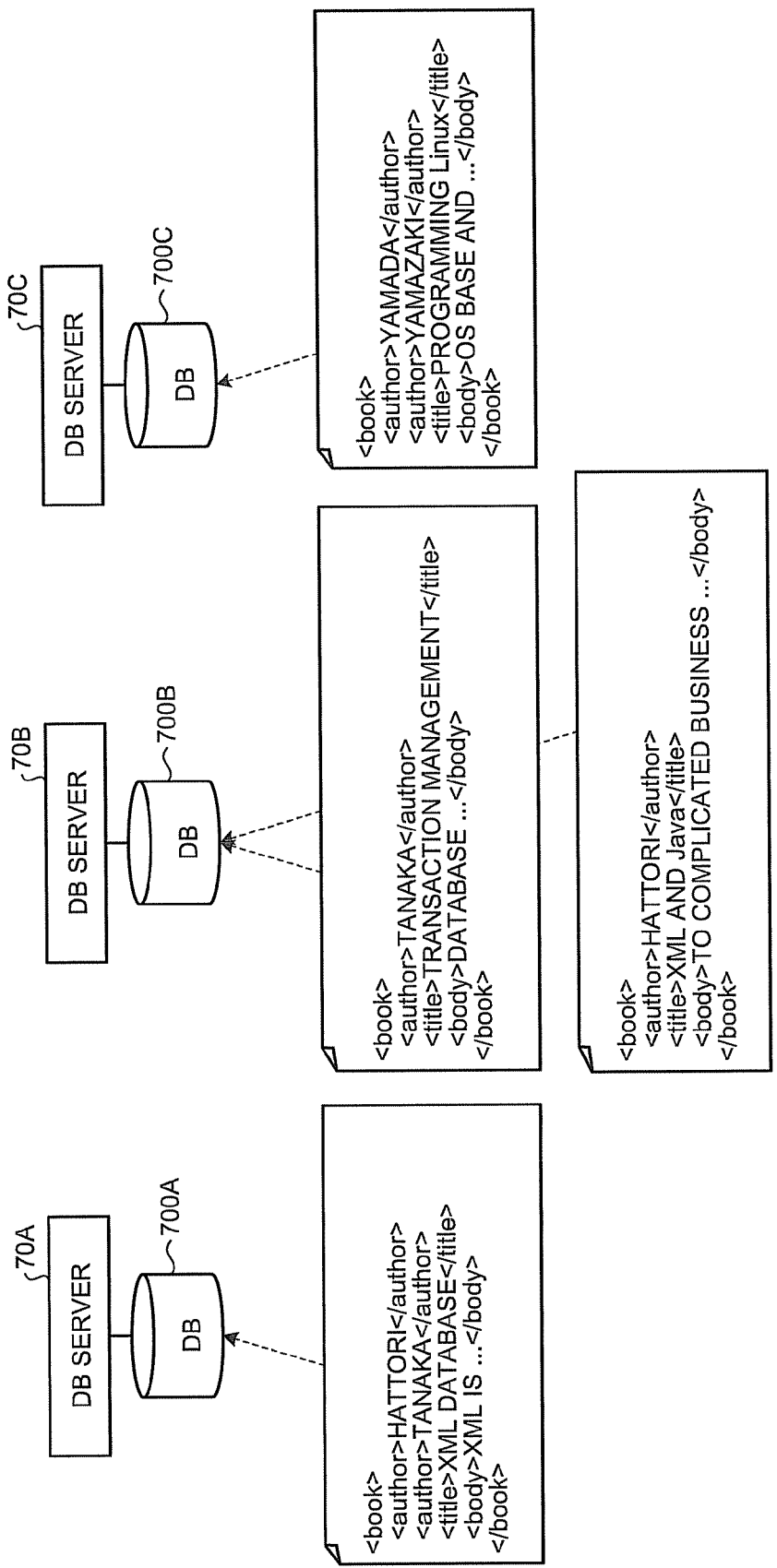
FIG. 7 is a diagram illustrating an example of XML data stored in databases (DBs) according to the embodiment.

A distribution plan generated by the plan generating unit 601 in the distributed XML database 51 according to the embodiment is explained. It is assumed here that XML data as shown in FIG. 7 are stored in the DBs 700A to 700C, respectively, for example. As shown in FIG. 7, the DB 700A stores therein one piece of XML data, the DB 700B stores therein two pieces of XML data, and the DB 700C stores therein one piece XML data.

Figure 8:
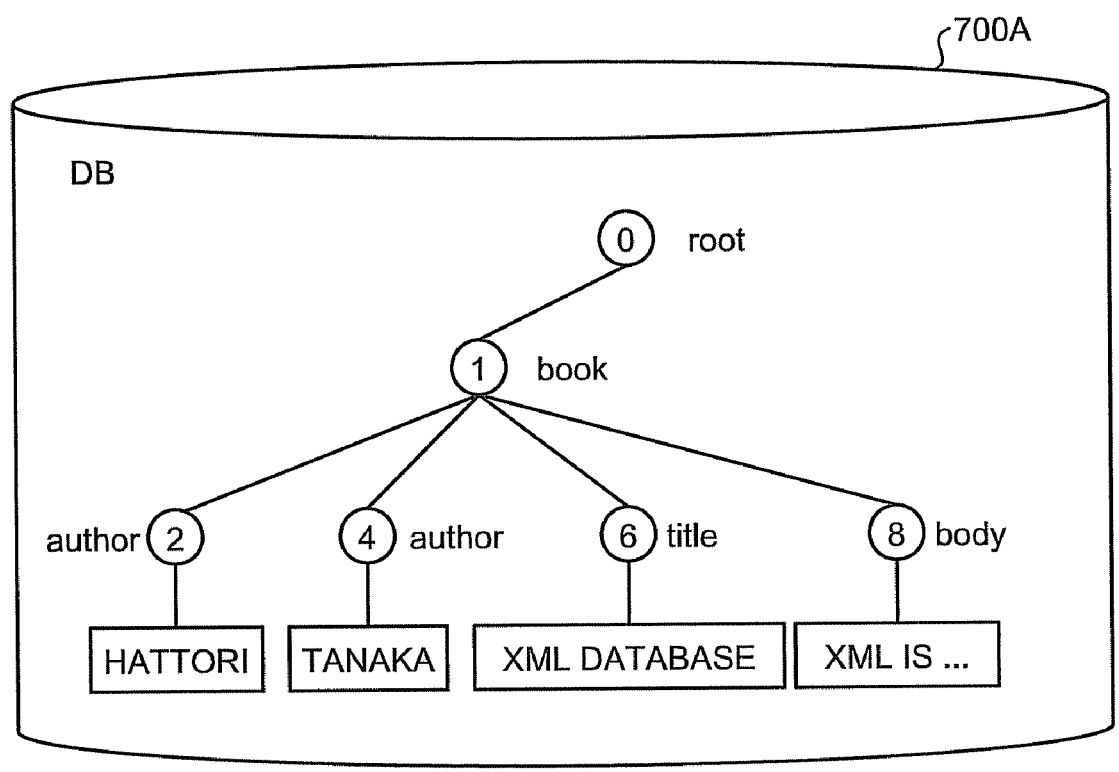
FIG. 8 is a schematic diagram illustrating a state where the XML data as shown in FIG. 7 is physically stored in one of the DBs.

FIG. 8 is a schematic diagram illustrating a state where the XML data as shown in FIG. 7 is physically stored in the DB 700A. As described above, the DBs 700 are stored in the external storages such as the HDD. However, the DBs 700 can be resident in a memory. As shown in FIG. 8, the XML data is represented with objects and links in a form similar to a document object model (DOM). One <book> object is located immediately below a <ROOT> object, and connected to the <ROOT> object via a link indicating a parent-child relation. There is a text object indicating text data in the lowermost layer.

Figure 9:
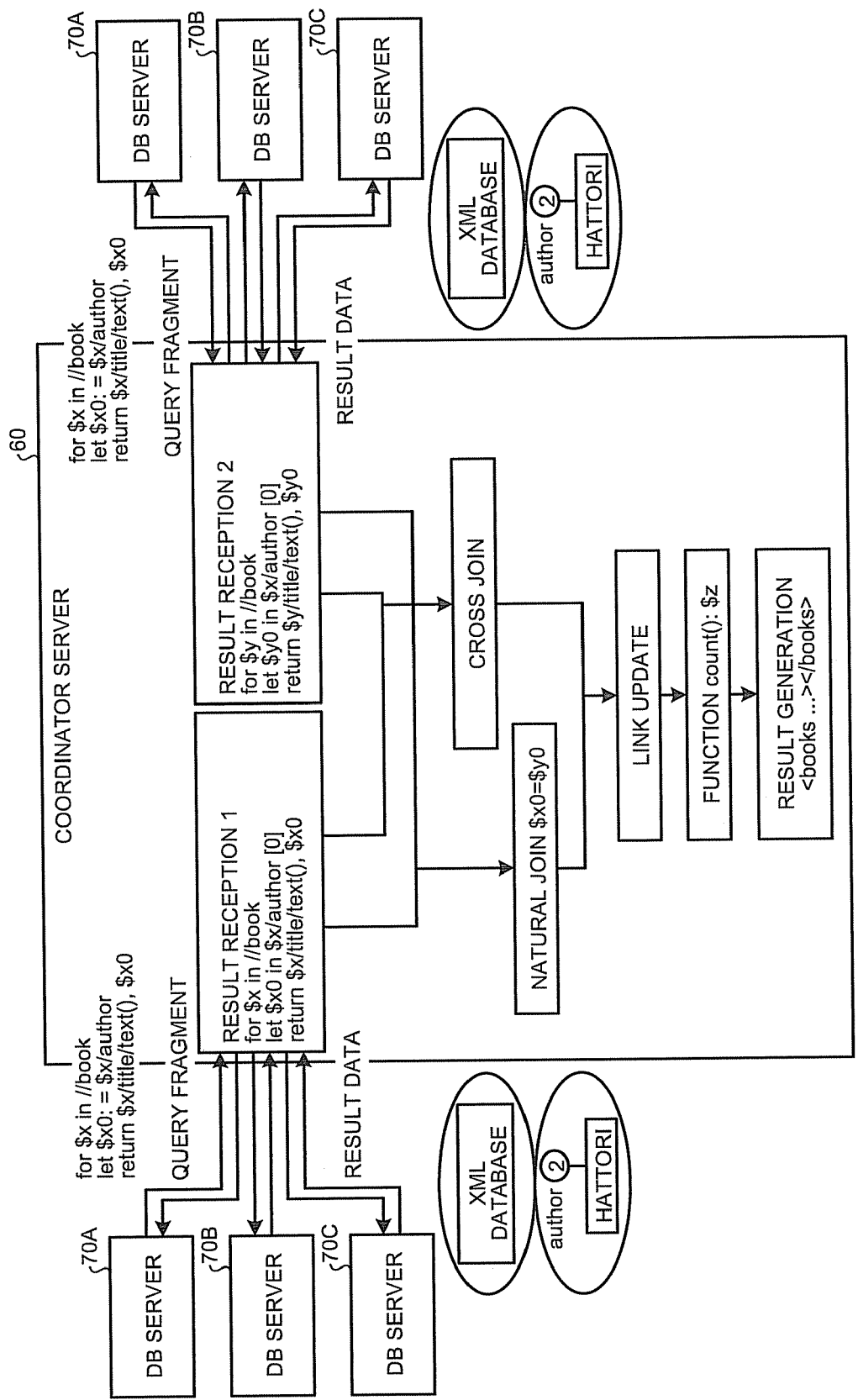
FIG. 9 is a schematic diagram illustrating an example of a process according to a distribution plan generated by a plan generating unit according to the embodiment.

FIG. 9 is a schematic diagram illustrating an example of a process according to the distribution plan generated by the plan generating unit 601 according to the embodiment. As shown in FIG. 9, the distribution plan includes a query fragment to be transmitted to the DB servers 70A to 70C by the result reception operator. This query fragment requests acquisition of limited XML data including only elements corresponding to a fragmented query [for $x in //book let $x0:=$x/author return $x/title/text( ), $x0]. The query fragment is transmitted to the DB servers 70A to 70C by the result reception operator, and executed by the DB servers 70A to 70C. Result data including XML data retrieved by the execution are transmitted from the DB servers 70A to 70C, and received by the result reception operator. As a result, the operator executing unit 6020 can obtain the limited XML data including only elements such as "XML DB" and <author>Hattori</author>. Link information is added to the result data based on the header mentioned above, and the resultant data is stored in the hierarchy-table managing unit 6022 as a hierarchy table. The distribution plan as shown in FIG. 9 is executed for the hierarchy tables stored based on the result data that are retrieved from the DB servers 70A to 70C by the cross join operator and the natural join operator, respectively. Two hierarchy tables outputted by the operators are related to each other by the link update operator. That is, when upper hierarchy tables are cross-joined to output a new hierarchy table, and lower hierarchy tables are natural-joined to output a new hierarchy table, newly outputted hierarchy tables have two pieces of link information, respectively. Accordingly, a process of updating each of the link information is performed by using the two pieces of link information included in each of the outputted hierarchy tables.

Figure 10:
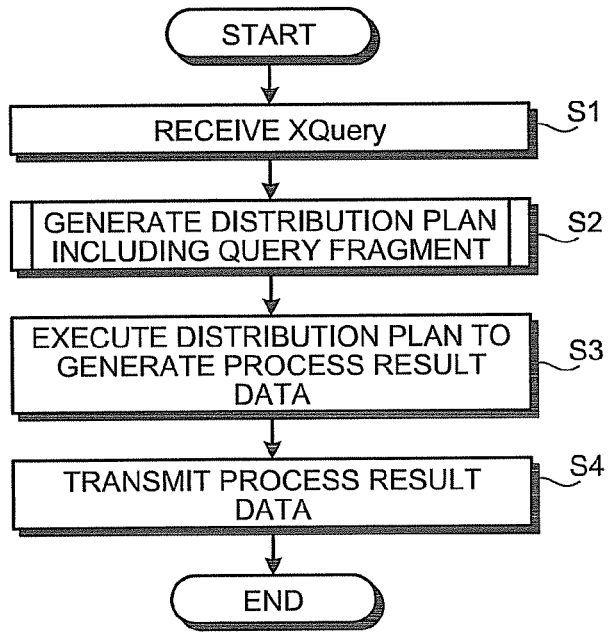
FIG. 10 is a flowchart of an entire process procedure performed by a distributed XML database according to the embodiment.

An entire process procedure performed by the distributed XML database 51 is explained with reference to FIG. 10. The receiving unit 600 of the coordinator server 60 first receives a process request (XQuery) transmitted from the client 50 (Step S1). The plan generating unit 601 analyzes the XQuery received at Step S1, and generates a distribution plan including query fragments according to a result of the analysis (Step S2). The executing unit 602 executes the distribution plan generated at Step S2, and generates XML data corresponding to the XQuery received at Step S1 as process result data (Step S3). In the execution of the plan, the executing unit 602 transmits the query fragment to the DB servers 70A to 70C, receives results of execution of the query fragment from the DB servers 70A to 70C, and executes a process by using the received execution results to generate the process result data. The result-data transmitting unit 603 transmits the process result data generated at Step S3 to the client 50 (Step S4).

Figure 11:
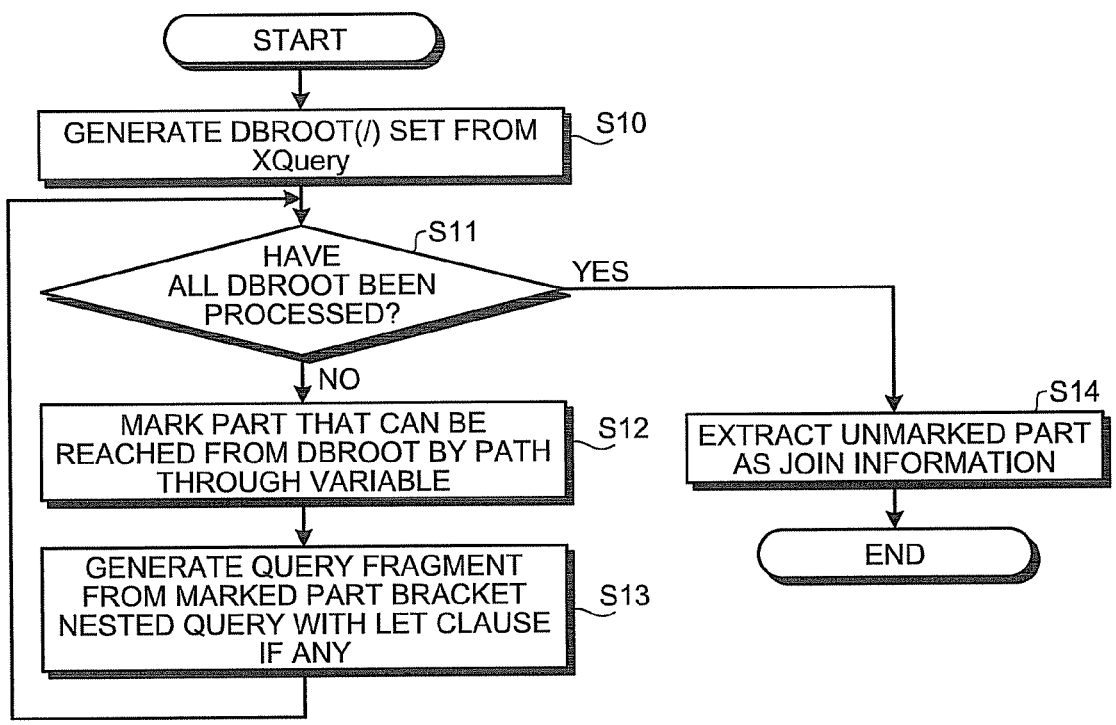
FIG. 11 is a flowchart of a process procedure performed by a query-fragment extracting unit of the plan generating unit.

Details of the process performed by the plan generating unit 601 at Step S2 are explained. FIG. 11 is a flowchart of a process procedure performed by the query-fragment extracting unit 6010 of the plan generating unit 601. The query-fragment extracting unit 6010 analyzes the XQuery received at Step S1, and generates DBROOTs, that is, a set of "/" parts (Step S10). The query-fragment extracting unit 6010 then performs a following process to all the DBROOTs (Step S11). When it is determined that not all the DBROOTs have been processed (NO at Step S11), the query-fragment extracting unit 6010 marks parts that can be reached from the DBROOT by a PATH expression by way of variables (such as $x) (Step S12). The query-fragment extracting unit 6010 extracts fragmentary queries (fragmented queries) from the marked parts, and generates query fragments by adding the control data mentioned above to the fragmented queries. When the XQuery has a nested structure, the query-fragment extracting unit 6010 brackets a nested query using a let clause (Step S13) (see FIG. 9). When the query-fragment extracting unit 6010 has performed the processes at Steps S12 and S13 to all the DBROOTs, the result of the determination at Step S11 becomes YES, and then the query-fragment extracting unit 6010 extracts unmarked parts as join information (Step S14). As a result, the query fragments are generated from the XQuery received at Step S1, and the join information is extracted from the XQuery.

Figure 12:
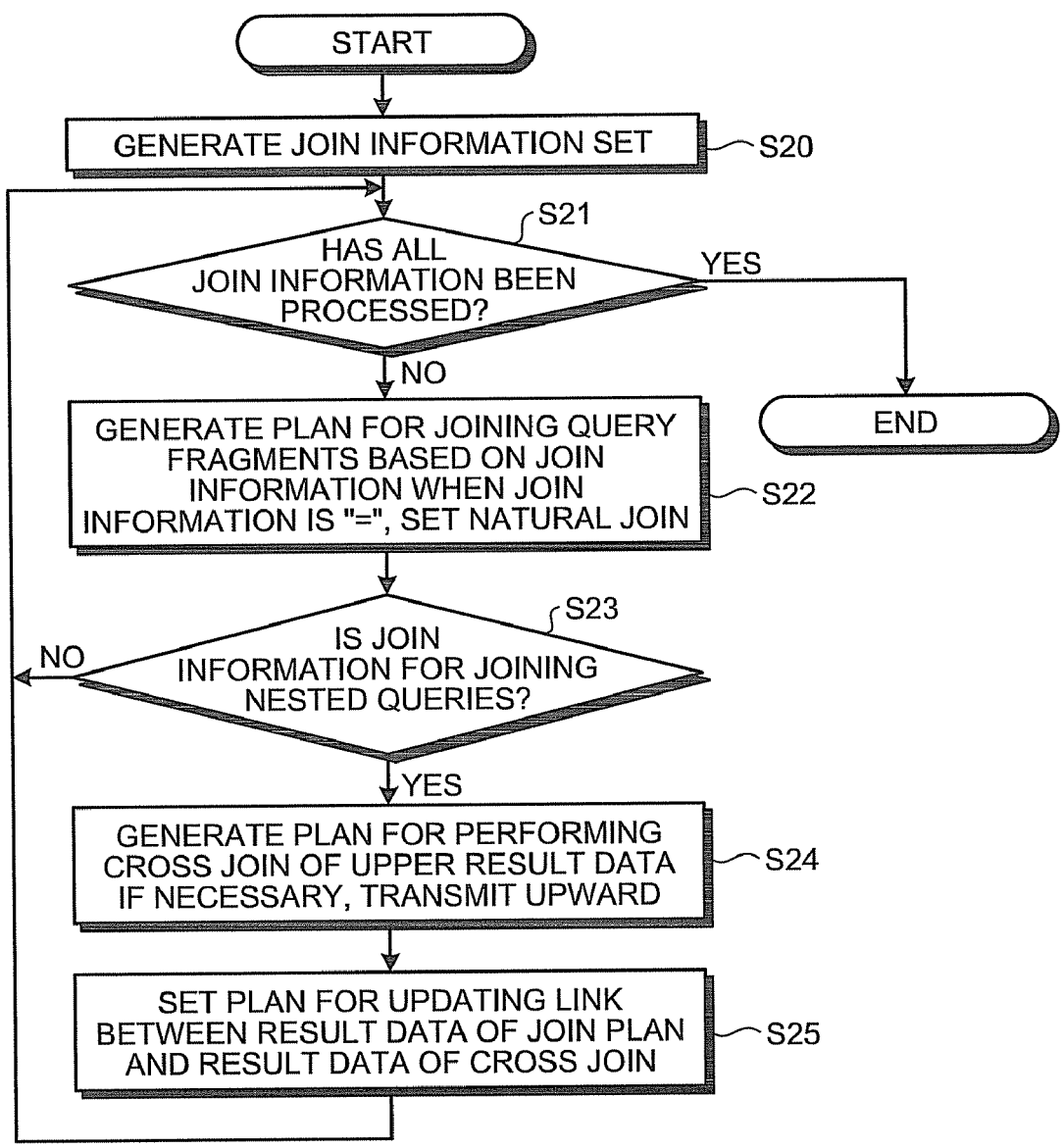
FIG. 12 is a flowchart of a process procedure performed by a join-plan generating unit of the plan generating unit.

A process procedure performed by the join-plan generating unit 6011 of the plan generating unit 601 is explained with reference to FIG. 12. The join-plan generating unit 6011 generates a set of the join information extracted at Step S14 mentioned above (Step S20). The join-plan generating unit 6011 then performs a following process to all the join information. The join-plan generating unit 6011 generates a plan for joining the query fragments generated by the query-fragment extracting unit 6010, based on the join information (Step S22). More specifically, the join-plan generating unit 6011 sets a natural join operator when the join information is "=". In this way, a processing instruction for performing a natural join is generated. When the join information is for joining nested queries (YES at Step S23), the join-plan generating unit 6011 sets a cross join operator for result data retrieved from upper hierarchies (Step S24). In this way, a processing instruction for performing a cross join is generated. If necessary, the instructions are transmitted upwards. The join-plan generating unit 6011 then sets a link-update operator for updating a link between result data of the natural join and result data of the cross join (Step S25). In this way, a processing instruction for performing link update is generated. The join-plan generating unit 6011 returns to Step S21 to process the next process-target join information. The join-plan generating unit 6011 returns to Step S21 similarly also when the join information is not for joining the nested queries (NO at Step S23). Upon completion of the process for all the join information (YES at Step S21), the process to be performed by the join-plan generating unit 6011 ends. Although not shown, the plan generating unit 601 generates a processing instruction for performing a function operation by properly setting a function operator. The plan generating unit 601 then sets a result generation operator to result data obtained by the function operation, thereby processing the result data into an XML format, to generate a processing instruction for transmitting the XML data to the client 50 as the process result data. As a result, a join plan is generated.

The distribution-plan converting unit 6012 then sets a result reception operator to the query fragments included in the join plan generated by the join-plan generating unit 6011, to generate a distribution plan. This is the end of the process performed by the plan generating unit 601 at Step S2.

Figure 13:
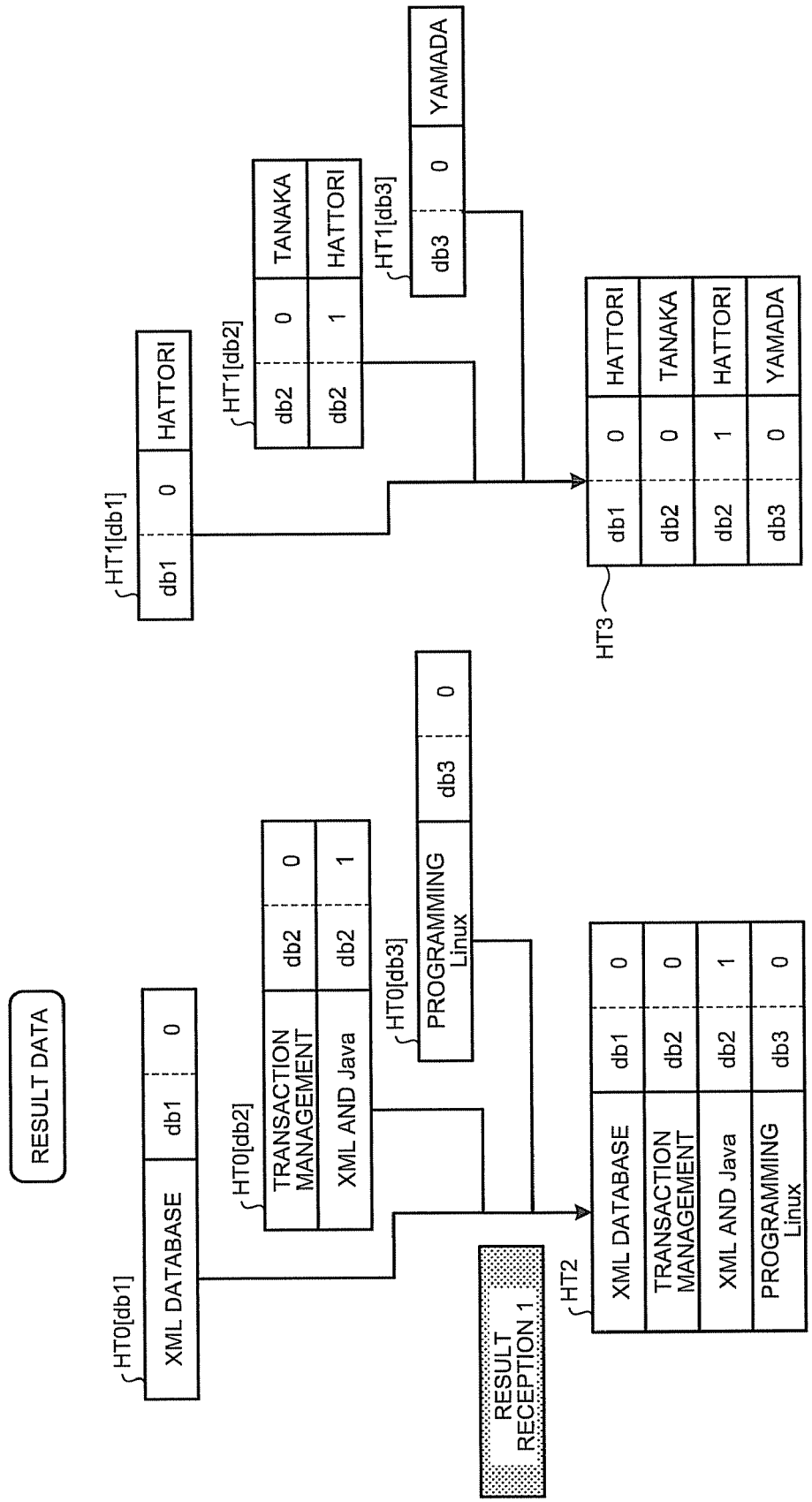
FIG. 13 is a schematic diagram illustrating an example of data input and output when an operator executing unit according to the embodiment executes a distribution plan and first executes a result reception operator.

Data input and output when the executing unit 602 executes at Step S3 the distribution plan generated at Step S2 are explained. It is assumed here that the distribution plan as shown in FIG. 9 is generated. FIG. 13 is a schematic diagram illustrating an example of data input and output when the operator executing unit 6020 executes the distribution plan and first executes the result reception operator. The operator executing unit 6020 executes the result reception operator to transmit the query fragments to the DB servers 70A to 70C, and shows results of the execution. The operator executing unit 6020 further receives result data to which headers are added from the DB servers 70A to 70C, to obtain a union. More specifically, the operator executing unit 6020 receives one piece of result data having a header "HT0[db1]" added, from the DB server 70A by the result reception operator, adds the link information "db1,0" to the received data, and stores resultant data in the hierarchy-table managing unit 6022 as a hierarchy table HT0[db1]. Similarly, the operator executing unit 6020 receives two pieces of result data having a header "HT0[db2]" added, from the DB server 70B by the result reception operator, adds the link information "db2,0" and "db2,1" to the received two pieces of result data, respectively, and stores resultant data in the hierarchy-table managing unit 6022 as a hierarchy table HT0[db2]. The operator executing unit 6020 receives result data having a header "HT0[db3]" added, from the DB server 70C by the result reception operator, adds the link information "db3,0" to the received data, and stores resultant data in the hierarchy-table managing unit 6022 as a hierarchy table HT0[db3]. The operator executing unit 6020 obtains a union of the hierarchy tables HT0[db1] to HT0[db3], and outputs the union to the hierarchy-table managing unit 6022 as a hierarchy table HT2. Similarly, the operator executing unit 6020 receives the result data having the headers "HT1[db1]" to "HT1[db3]" added, from the DB servers 70A to 70C, adds the corresponding link information to the received data, and stores resultant data in the hierarchy-table managing unit 6022 as the hierarchy tables HT1[db1] to HT1[db3], respectively. The operator executing unit 6020 obtains a union of the hierarchy tables HT1[db1] to HT1[db3], and outputs the union to the hierarchy-table managing unit 6022 as a hierarchy table HT3.

Figure 14:
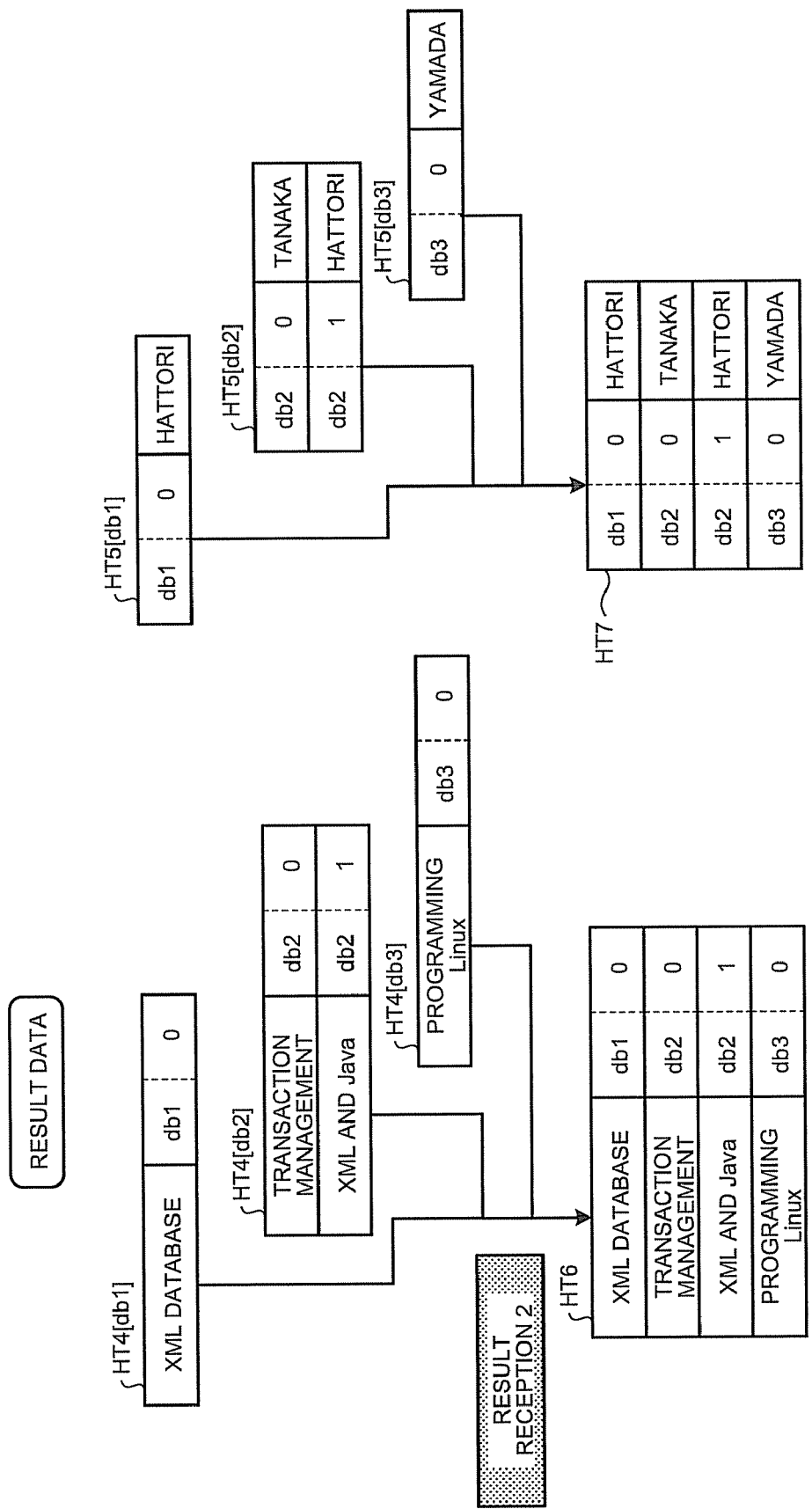
FIG. 14 is a schematic diagram illustrating an example of data input and output when the operator executing unit executes the result reception operator for the second time.

FIG. 14 is a schematic diagram illustrating an example of data inputted and outputted when the operator executing unit 6020 executes the result reception operator for the second time. In the same manner as mentioned above, the operator executing unit 6020 receives result data having headers "HT4[db1]" to "HT4[db3]" added thereto, from the DB servers 70A to 70C, respectively, and adds the corresponding link information to the received data. The operator executing unit 6020 stores resultant data in the hierarchy-table managing unit 6022 as hierarchy tables HT4[db1] to HT4[db3], and obtains a union of the hierarchy tables HT4[db1] to HT4[db3] to output a hierarchy table HT6 to the hierarchy-table managing unit 6022. The operator executing unit 6020 also receives result data having headers "HT5[db1]" to "HT5[db3]" added thereto, from the DB servers 70A to 70C, respectively, and adds the corresponding link information to the received data. The operator executing unit 6020 stores resultant data in the hierarchy-table managing unit 6022 as hierarchy tables HT5[db1] to HT5[db3], and obtains a union of the hierarchy tables HT5[db1] to HT5[db3] to output a hierarchy table HT7 to the hierarchy-table managing unit 6022.

Figure 15:
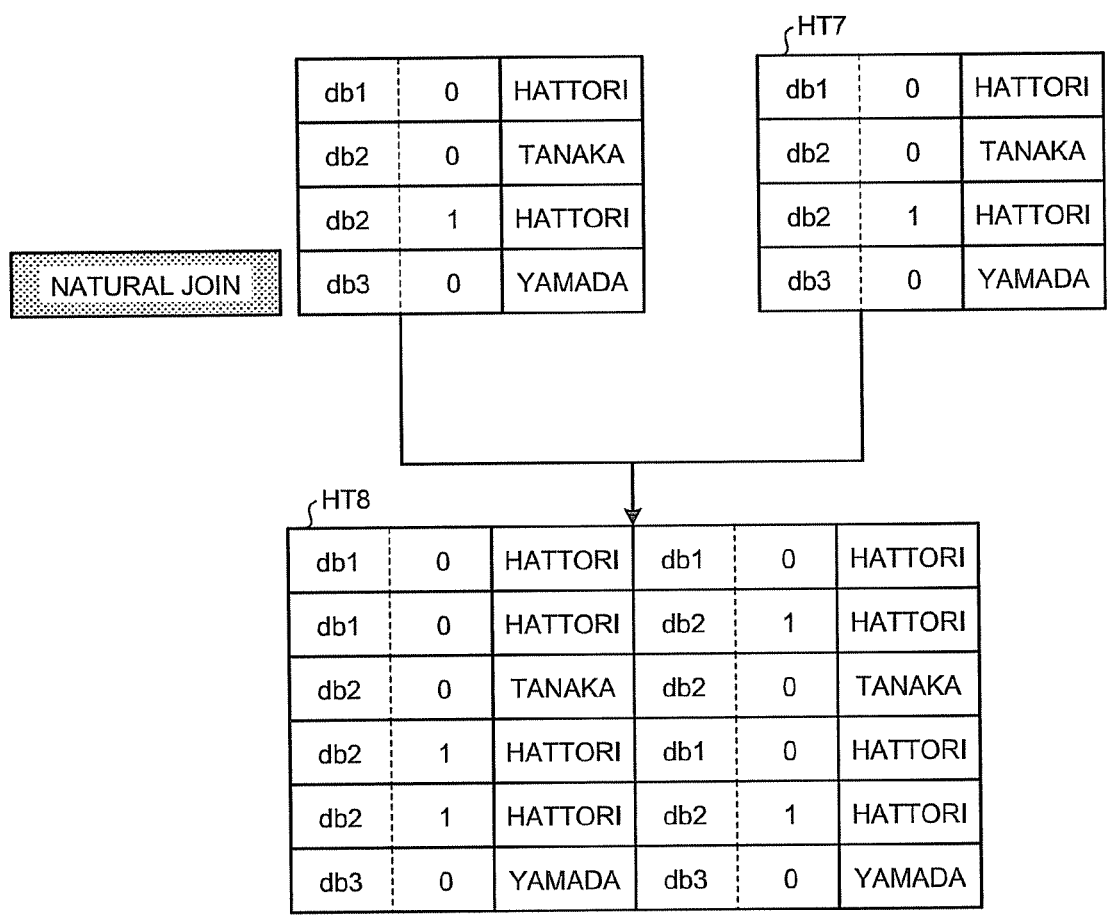
FIG. 15 is a schematic diagram illustrating an example of data input and output when the operator executing unit executes a natural join operator.

FIG. 15 is a schematic diagram illustrating an example of data inputted and outputted when the operator executing unit 6020 executes a natural join operator. The operator executing unit 6020 executes a natural join operator, thereby performing a natural join of inputs of the hierarchy tables HT3 and HT7 as a process corresponding to "$x0=$y0", and outputs a result of the natural join to the hierarchy-table managing unit 6022 as a hierarchy table HT8.

Figure 16:
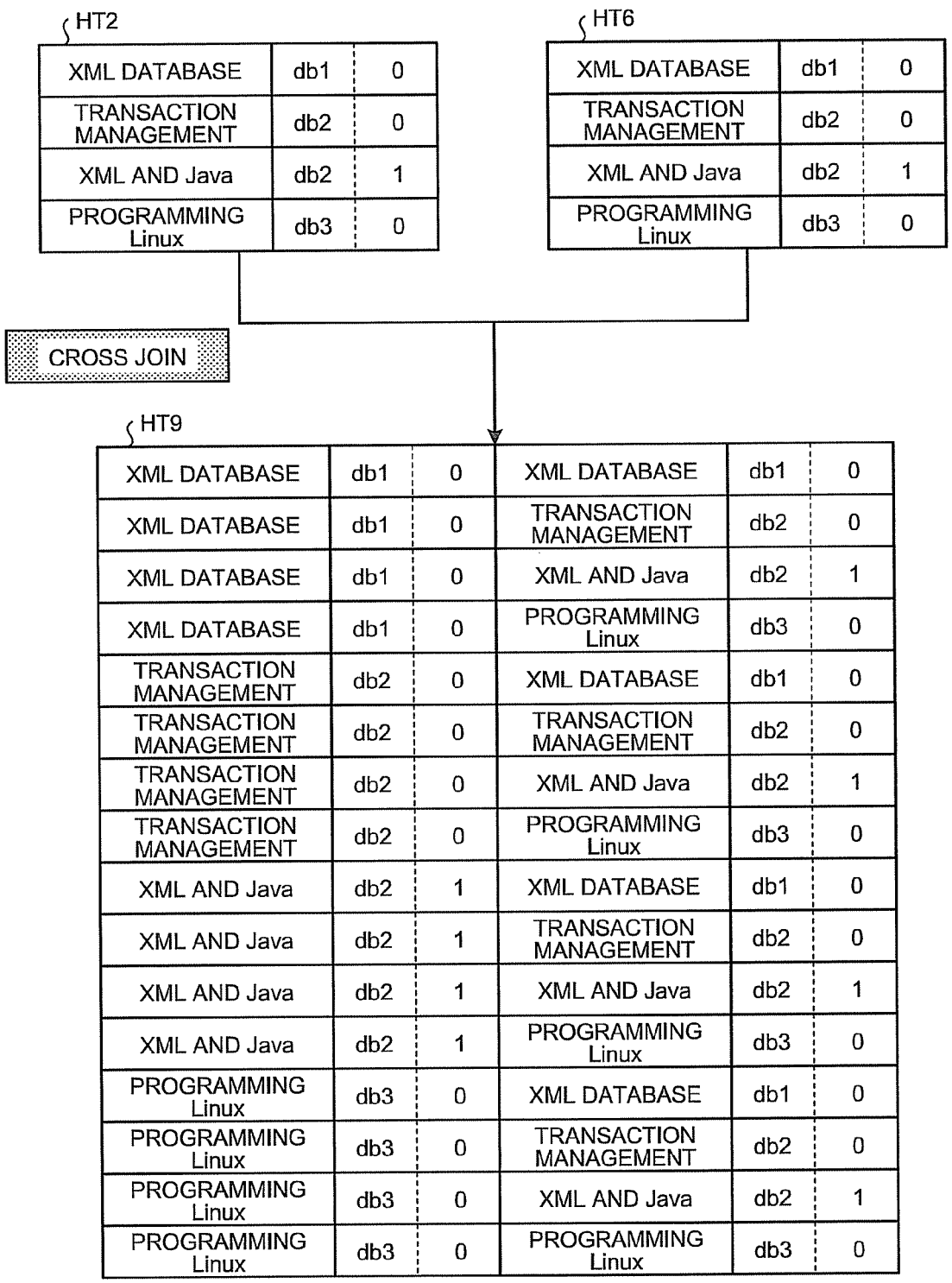
FIG. 16 is a schematic diagram illustrating an example of data input and output when the operator executing unit executes a cross join operator.

FIG. 16 is a schematic diagram illustrating an example of data inputted and outputted when the operator executing unit 6020 executes a cross join operator. The operator executing unit 6020 executes a cross join operator, thereby performing a cross join of inputs of the hierarchy tables HT2 and HT6, and outputs a result of the cross join to the hierarchy-table managing unit 6022 as a hierarchy table HT9.

Figure 17:
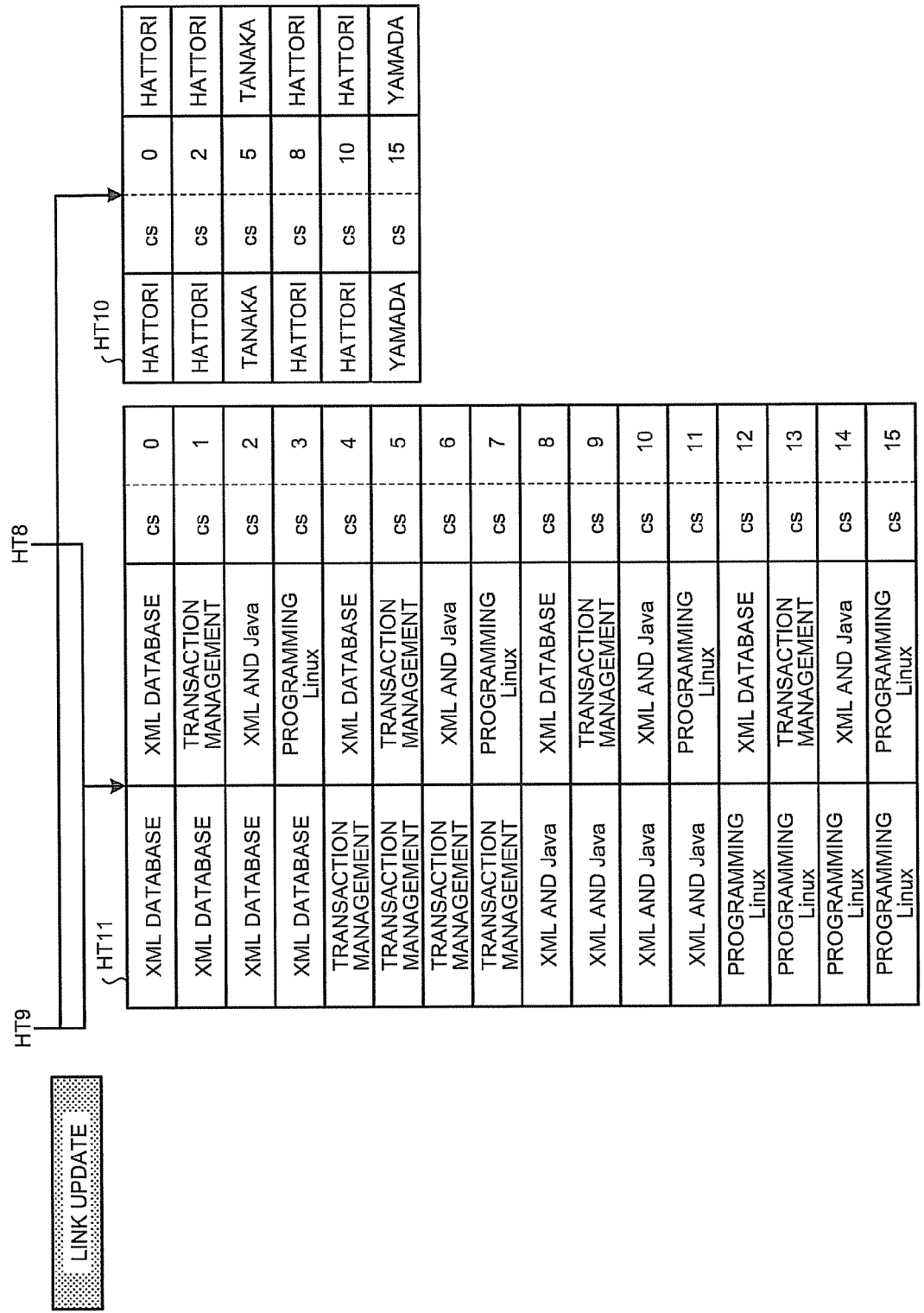
FIG. 17 is a schematic diagram illustrating an example of data input and output when the operator executing unit executes a link update operator.

FIG. 17 is a schematic diagram illustrating an example of data inputted and outputted when the operator executing unit 6020 executes a link update operator. The operator executing unit 6020 executes a link update operator, thereby updating each link information by using two pieces of link information included in the hierarchy tables HT8 and HT9, to output a new hierarchy table. More specifically, the operator executing unit 6020 performs following processes. The second column (link information) and the fourth column (link information) of the hierarchy table HT9 are plural columns (hereinafter, "composite link") obtained as a result of the cross join. The operator executing unit 6020 integrates the composite link columns of the hierarchy table HT9, to be updated with a single column (hereinafter, "single link"), and outputs an updated hierarchy table to the hierarchy-table managing unit 6022 as a hierarchy table HT11. The operator executing unit 6020 assigns a pair of a server number that enables to uniquely identify the coordinator server 60 (for example, "cs") and a record number that enables to uniquely identify data in the hierarchy table HT9 (for example, natural numbers in ascending order, such as 1, 2, 3, . . . ) as values of the single link.

The first column (link information) and the third column (link information) of the hierarchy table HT8 are a composite link obtained as a result of the natural join. Accordingly, the operator executing unit 6020 integrates the composite link columns of the hierarchy table HT8 obtained as a result of the natural join by using the updated link information, to be updated with the single link. The operator executing unit 6020 then outputs an updated hierarchy table to the hierarchy-table managing unit 6022 as a hierarchy table HT10. Also at this time, the operator executing unit 6020 assigns a pair of the server number and the record number that enables to uniquely identify data in the hierarchy table HT8 as mentioned above as values of the single link. The link update operator can be implemented by using a memory data structure that can be accessed at high speeds, such as a hash table.

Figure 18:
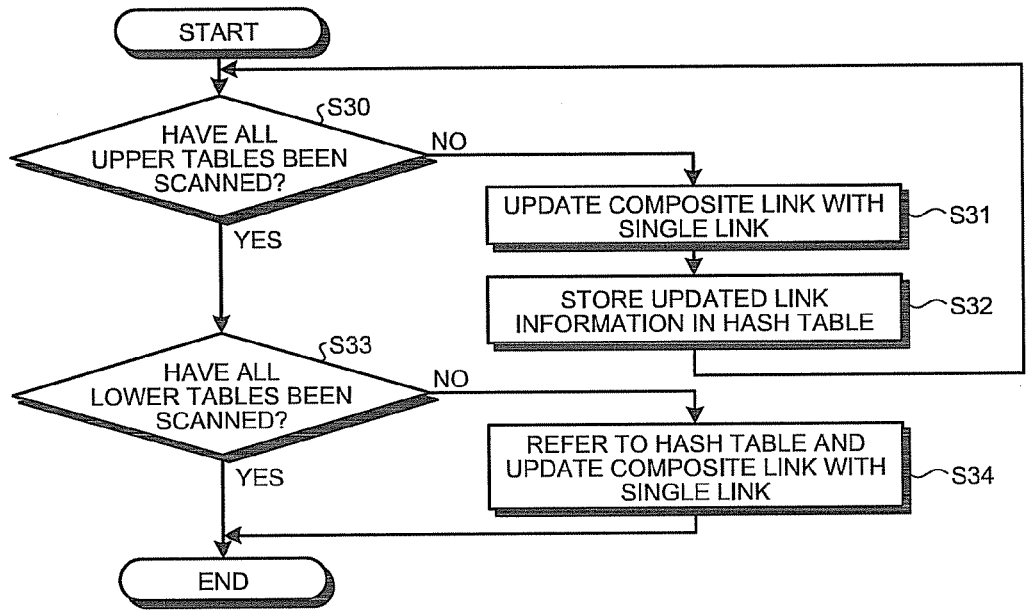
FIG. 18 is a flowchart of a process procedure performed by the operator executing unit to perform link update by executing the link update operator.

A process procedure performed by the operator executing unit 6020 to perform the link update by executing the link update operator is explained with reference to FIG. 18. The operator executing unit 6020 executes the link update operator to determine whether all records in upper hierarchy tables have been scanned (Step S30). When determining that not all the records have been scanned (NO at Step S30), the operator executing unit 6020 assigns unique link information to a pair of the DB server number and the record number stored in the composite link columns of a record that has not been scanned yet, thereby updating the link information (Step S31). More specifically, the operator executing unit 6020 assigns a pair of the server number of the coordinator server 60 and the record number that enables to uniquely identify the record in the hierarchy table HT9 as new link information. The operator executing unit 6020 stores the updated link information in the hash table (Step S32).

When determining that all the records in the upper hierarchy tables have been scanned (YES at Step S30), the operator executing unit 6020 determines whether all records in lower joined tables have been scanned (Step S33). When determining that not all the records have been scanned yet (NO at Step S33), the operator executing unit 6020 refers to the hash table, and assigns unique link information to a pair of the DB server number and the record number stored in a composite link column of a record that has not been scanned yet, thereby updating the link information (Step S34). When determining that all the records have been scanned (YES at Step S33), the operator executing unit 6020 terminates the process.

In this way, the records in the upper hierarchy tables and the records in the lower hierarchy tables can be related to each other.

Figure 19:
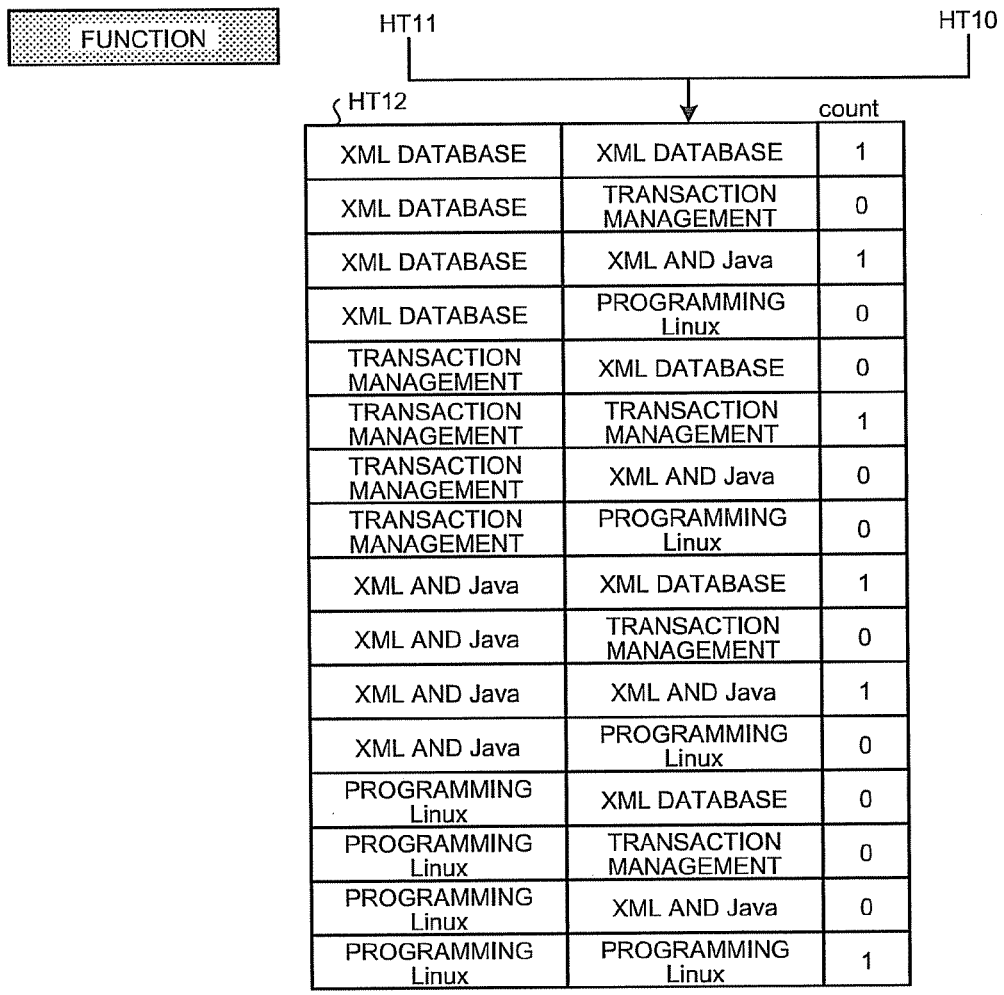
FIG. 19 is a schematic diagram illustrating an example of data input and output when the operator executing unit executes a function operator.

FIG. 19 is a schematic diagram illustrating an example of data inputted and outputted when the operator executing unit 6020 executes a function operator. In this example, a set of records in a hierarchy lower than the hierarchy table HT11 can be obtained by referring to a link relation between the hierarchy tables HT11 and HT10 from the link information. The operator executing unit 6020 executes a function operator "count", thereby calculating the records. The operator executing unit 6020 then sets the obtained value (for example, 1, 0, 1, 0, 0, . . . ) in the third column of the hierarchy tables HT11, to output a hierarchy table HT12 to the hierarchy-table managing unit 6022.

By using the hierarchy table HT12, the operator executing unit 6020 executes a result generation operator, to generate XML data in the XML form. As a result, the XML data according to the XQuery transmitted from the client 50 is generated. This is the end of the process to be performed by the operator executing unit 6020 at Step S3. The XML data generated at Step S3 is then transmitted at Step S4 to the client 50 as the process result data, which is the end of the entire process.

Figure 20:
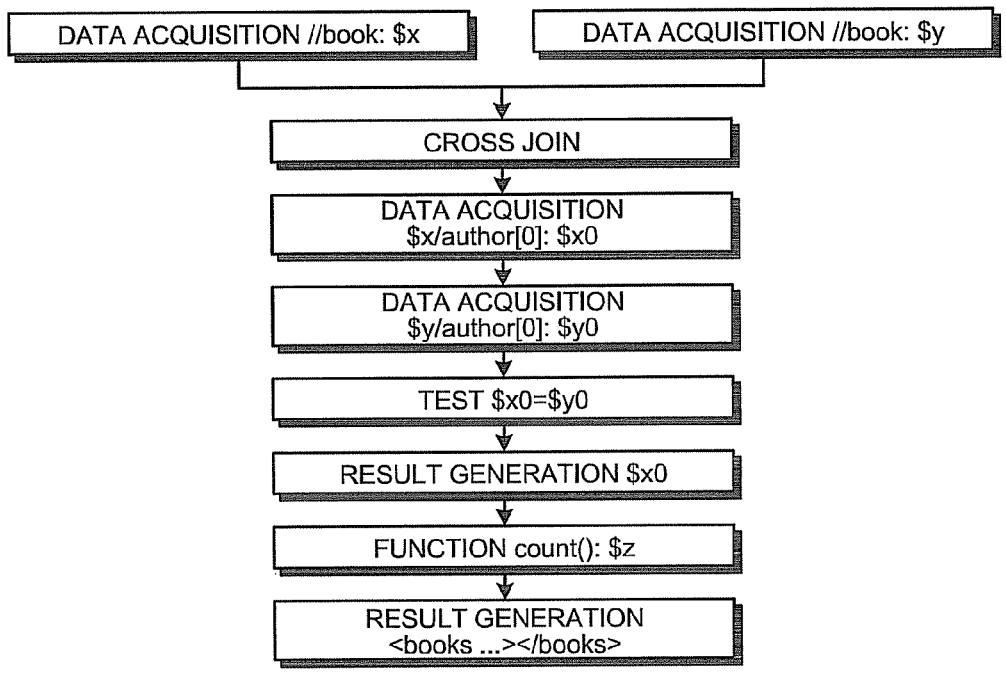
FIG. 20 is a schematic diagram illustrating an example of a process performed according to a single plan generated based on the XQuery according to the embodiment shown in FIG. 3.

For comparison of the distribution plan generated according to the embodiment, a single plan generated by a typical method in a single XML database instead of the distributed XML database is explained with reference to FIG. 20. FIG. 20 is a schematic diagram illustrating an example of a process performed according to a single plan generated based on the XQuery as shown in FIG. 3. As shown in FIG. 20, the typical method regards that, when there is a let clause, an outer XQuery and an inner XQuery (that is, a nested clause) have an input-output relation. Upon completion of processing of the outer XQuery, a combination of input variables is set, passed to the inner XQuery, and then processed. In FIG. 20, a data acquisition operator corresponding to an outer for clause is first executed to obtain "//book". The result is recorded in a table. Because the for clause is a dual clause, the process mentioned above is performed twice. The nested clause is processed then. A cross join operator is executed for an input of two tables, thereby generating one table. A data acquisition operator "$x/author[0]" and a data acquisition operator "$y/author[]0" are then executed, and tables including "$x0" and "$y0", respectively, are generated. A test operator checks whether "$x0=$y0", and the tables are narrowed down to only records that have passed the test. A result generation operator corresponding to a nested return clause is then executed. A function operator "count" is then executed, thereby generating a table including "$z". A result generation operator corresponding to an outer return clause is finally executed.

Figure 21:
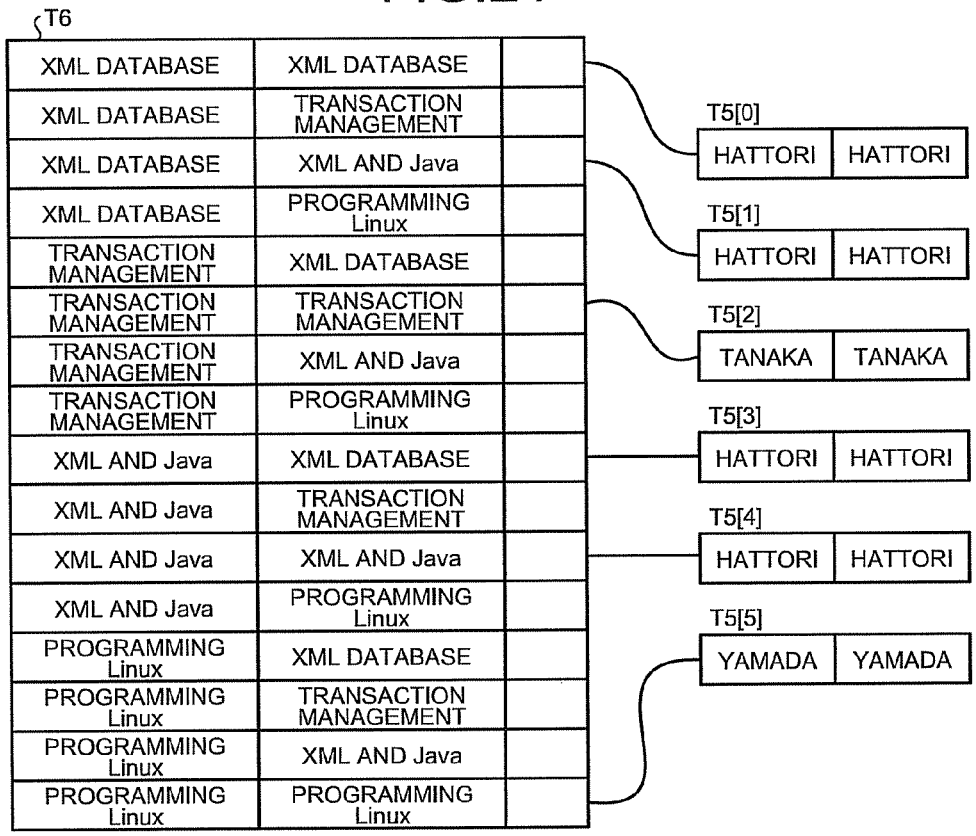
FIG. 21 is a diagram illustrating an example of a table before a function operator "count" according to the embodiment is executed.

FIG. 21 is a diagram illustrating an example of a table before the function operator "count" is executed. Nesting is represented by links between tables. Links are provided from a table T6 to tables T5[0] to T5[5].

Figure 22:
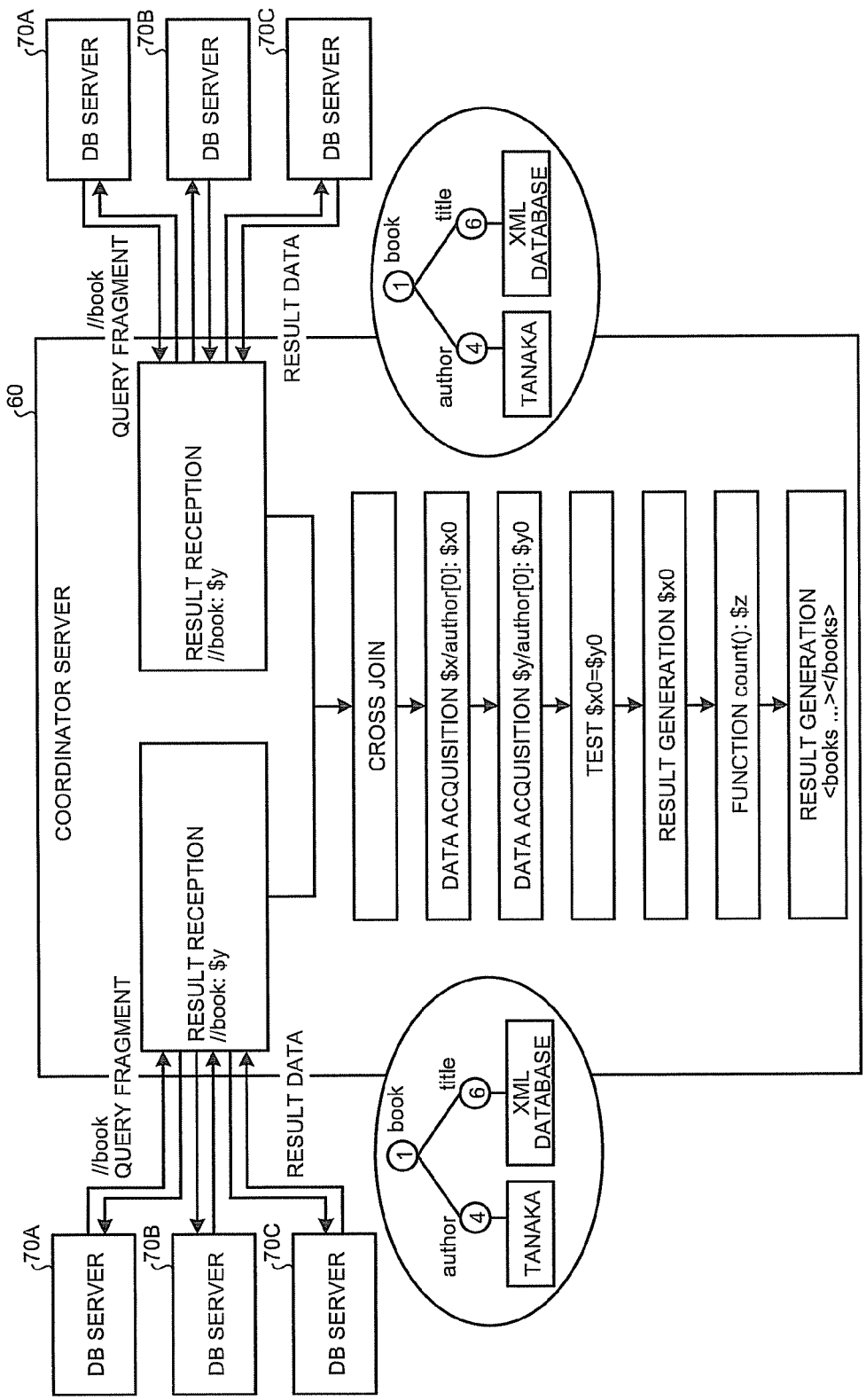
FIG. 22 is a schematic diagram illustrating an example of a process performed according to a plan (extended plan) that is obtained by extending the single plan according to the embodiment for a distributed XML database as shown in FIG. 20.

A plan (extended plan) that is obtained by extending the single plan as shown in FIG. 20 for a distributed XML database is explained with reference to FIG. 22. The extended plan shown in FIG. 22 has approximately the same configuration as the single plan shown in FIG. 20, except that the data acquisition operator shown in FIG. 20 is replaced with a result reception operator. The result reception operator transmits all the plans "//book" to the DB servers 70A to 70C, and receives process results of the plans to obtain a union thereof. That is, according to the result reception operator, data below "//book" in the DB servers 70A to 70C all need to be received by the coordinator server 60. When the number of the plans "//book" in the DB servers 70A to 70C is large, or when the sizes of the plans are large, the cost required for transferring the plans becomes considerable. The cross join is performed in the initial stage. Therefore, when the number of the plans "//book" is large, combinations thereof increase in the number, which leads to an increase in the cost required for the processing by the data acquisition operator or the test operator. Accordingly, it is difficult to sufficiently utilize the performance of the distributed XML database only by simply extending the single plan for the distributed XML database.

By contrast, according to the distributed plan of the embodiment, nested functions that are liberated from ordering limitations can be achieved by using hierarchy tables that are related to each other using link information and joining the hierarchy tables using the link information. More specifically, in the case of hierarchy tables each having N layers, nested functions can be achieved by executing (N−1) times of a cross join, (N−1) times of a link update, and one time of a natural join. Therefore, it is unnecessary to repeatedly perform nested functions by the number of upper multiple loops, unlike in the typical technique. This is exemplified by the difference in the number of execution of operators. When the upper multiple loop is larger, the difference in performance from the typical technique becomes larger. Because the cross join and the natural join are performed separately, the cost required by the natural join operator can be reduced even when the number of plans "Y//book" is large. That is, the configuration according to the embodiment eliminates useless calculation, which can increase the speed of processing of the XQuery including nested clauses, and can reduce the amount of the calculation by converting a polynomial expression into a linear expression.

The coordinator server 60 requests the DB server 70 to acquire only limited XML data corresponding to a fragmentary query "for $x in //book let $x0:=$x/author return $x/title/text( ), $x0" extracted from the XQuery, by using a query fragment. Accordingly, the need to receive all XML data from the DB server 70 by the upper for clause is eliminated. As a result, the quantity of data to be transferred becomes small, which minimizes the cost required for the transfer.

In the above embodiment, various programs to be executed by the coordinator server 60 can be stored in a computer connected to a network such as the Internet, and be provided by being downloaded through the network. These programs can be provided being recorded in a computer-readable recording medium such as a CD-ROM, a flexible disk (FD), a CD recordable (CD-R), a digital versatile disk (DVD), in a file of an installable or executable form.

In the above embodiment, the operator executing unit 6020 adds the link information to each record stored in the hierarchy tables. Alternatively, the executing unit 602 can additionally include an identifier adding unit, and add the link information to each record.

In the above embodiment, the XML data is handled as a structured document having a hierarchical structure. However, the XML data is not the only structured document having a hierarchical structure.

In the above embodiment, the query-fragment extracting unit 6010 generates a query fragment including control data. Alternatively, the distribution-plan converting unit 6012 can generate a query fragment, and set a result reception operator to the query fragment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A database processing apparatus that is connected to plural distributed database servers each having a database that stores a structured document including at least one element, the apparatus comprising:
a receiving unit that receives a process request for requesting a process related to the structured document;
a plan generating unit that generates a process plan, including processing instructions each corresponding to a unit of execution, to perform the process;
a executing unit that executes the process plan, by executing each of the processing instructions;
a storage unit that stores a result of execution of each of the processing instruction;
a result generating unit that generates a first structured document according to the process request by using the result of execution; and
a result transmitting unit that transmits the first structured document, wherein
the plan generating unit includes a first generating unit that generates at least one first processing instruction for acquiring all or part of elements included in a structured document to be processed based on the process request,
a second generating unit that generates a second processing instruction for performing a natural join by using result data including the elements acquired according to the first processing instruction,
a third generating unit that generates a third processing instruction for performing a cross join by using the result data,
a fourth generating unit that generates a fourth processing instruction for updating a correspondence relation between a result of the natural join performed by executing the second processing instruction and a result of the cross join performed by executing the third processing instruction, based on these results,
a joining unit that joins the first to fourth processing instructions, thereby generating the process plan, and
a converting unit that converts the first processing instruction included in the process plan into a fifth processing instruction for transmitting at least one acquisition request for the acquisition of all or part of the elements to the database servers, and receiving result data including the elements acquired according to the acquisition request from the database servers, respectively, the received result data having a header added, the header being for identifying a correspondence relation between the result data transmitted according to the acquisition request and the database server that transmits the result data, wherein
the executing unit includes
a first executing unit that executes the fifth processing instruction, receives the result data from the database servers to aggregate the received result data in units of records, uniquely identifies the result data corresponding to the acquisition request and the database server that transmits the result data by using the header that is added to the result data, adds to each of the records of the result data an identifier that enables the database servers to uniquely identify the record, and stores resultant records in the storage unit as results of the execution of the fifth processing instruction.

2. The apparatus according to claim 1, wherein the process request is expressed in a syntax structured according to a predetermined rule, and the plan generating unit generates the second to fourth processing instructions for a syntax corresponding to a nested structure, when the syntax used to express the process request has the nested structure.

3. The apparatus according to claim 1, wherein the executing unit further includes
a second executing unit that executes the second processing instruction to perform the natural join by using the result data,
a third executing unit that executes the third processing instruction to perform the cross join by using the result data, and
a fourth executing unit that executes the fourth processing instruction to update a correspondence relation between the result of executions by using a result of the execution of the second processing instruction and a result of the execution of the third processing instruction, based on these result of executions.

4. The apparatus according to claim 3, wherein the storage unit stores the result of execution in units of records, the first generating unit generates the first processing instruction including the acquisition request for acquiring all of part of elements included in the processing-target structured document, and control data for identifying the acquisition request, based on the process request, and
the converting unit converts the first processing instruction into the fifth processing instruction for transmitting the acquisition request and the control data to the database servers, and receiving the result data to which a header for identifying a correspondence relation between the result data transmitted according to the acquisition request corresponding to the control data and the database server that transmits the result data is added, from each of the database servers.

5. The apparatus according to claim 4, wherein the second executing unit executes the second processing instruction to perform the natural join by using each of the records of the result data stored in the storage unit, and stores a result of the execution in the storage unit, and the third executing unit executes the third processing instruction to perform the cross join by using each of the records of the result data stored in the storage unit, and stores a result of the execution in the storage unit.

6. The apparatus according to claim 5, wherein the fourth executing unit executes the fourth processing instruction to combine the identifiers included in each of the records of the result of execution of the second processing instruction and the result of execution of the third processing instruction, stored in the storage unit, respectively, adds to the record a new identifier that enables to uniquely identify the record, instead of the combined identifiers, and stores the record in the storage unit.

7. The apparatus according to claim 6, wherein the process includes a predetermined operation, the plan generating unit includes a sixth generating unit that executes the fourth processing instruction to generate a seventh processing instruction for performing the predetermined operation to each of the result of executions having the correspondence relation updated, the joining unit joins the first to seventh processing instructions to generate the process plan, the executing unit includes a fifth executing unit that executes the seventh processing instruction included in the process plan, to identify a correspondence relation between the record included in the result of execution of the second processing instruction and the record included in the result of execution of the third processing instruction, stored in the storage unit, based on the new identifiers each being added to each of the records, executes the predetermined operation by using the records, and stores a result of the execution in the storage unit, and the result generating unit generates the first structured document by using the result of execution stored in the storage unit by the fifth executing unit.

8. The apparatus according to claim 1, wherein the receiving unit receives the process request in the XQuery form in response to the structured document in the XML form, and the result generating unit generates the first structured document in the XML form according to the process request.

9. An information processing method implemented in a database processing apparatus that includes a receiving unit, a plan generating unit, a executing unit, a storage unit that stores a result of execution of each of the processing instruction in units of records, a result generating unit, and a result transmitting unit, and that is connected to plural distributed database servers each having a database that stores a structured document including at least one element, the method comprising:
  receiving a process request for requesting a process related to the structured document by the receiving unit;
  generating a process plan, including processing instructions each corresponding to a unit of execution by the plan generating unit, to perform the process;
  executing the process plan, by executing each of the processing instructions;
  generating a first structured document according to the process request by the result generating unit using the result of execution stored in the storage unit;
  transmitting the first structured document by the result transmitting unit;
  generating at least one first processing instruction for acquiring all or part of elements included in a structured document to be processed based on the process request by the plan generating unit;
  generating a second processing instruction for performing a natural join by the plan generating unit using result data including the elements acquired according to the first processing instruction;
  generating a third processing instruction for performing a cross join by the plan generating unit using the result data;
  generating a fourth processing instruction by the plan generating unit for updating a correspondence relation between a result of the natural join performed by executing the second processing instruction and a result of the cross join performed by executing the third processing instruction, based on these results;
  joining the first to fourth processing instructions by the plan generating unit, thereby generating the process plan;
  converting the first processing instruction included in the process plan into a fifth processing instruction, by the plan generating unit, for transmitting at least one acquisition request for the acquisition of all or part of the elements to the database servers, and receiving result data including the elements acquired according to the acquisition request from the database servers, respectively, the received result data having a header added, the header being for identifying a correspondence relation between the result data transmitted according to the acquisition request and the database server that transmits the result data; and
  executing the fifth processing instruction, receiving the result data from the database servers to aggregate the received result data in units of records, uniquely identifying the result data corresponding to the acquisition request and the database server that transmits the result data by using the header that is added to the result data, adding to each of the records of the result data an identifier that enables the database servers to uniquely identify the record, and storing resultant records in the storage unit as results of the execution of the fifth processing instruction.

10. A computer program product having a non-transitory computer readable medium including programmed instructions, when executed by a computer provided in a database processing apparatus that includes a receiving unit, a plan generating unit, a executing unit, a storage unit that stores a result of execution of each of the processing instruction in units of records, a result generating unit, and a result transmitting unit, and that is connected to plural distributed database servers each having a database that stores a structured document including at least one element, wherein the instructions, cause the computer to perform:
  receiving a process request for requesting a process related to the structured document by the receiving unit;
  generating a process plan, including processing instructions each corresponding to a unit of execution by the plan generating unit, to perform the process;
  executing the process plan, by executing each of the processing instructions;
  generating a first structured document according to the process request by the result generating unit using the result of execution stored in the storage unit;
  transmitting the first structured document by the result transmitting unit;
  generating at least one first processing instruction for acquiring all or part of elements included in a structured document to be processed based on the process request by the plan generating unit;
  generating a second processing instruction for performing a natural join by the plan generating unit using result data including the elements acquired according to the first processing instruction;
  generating a third processing instruction for performing a cross join by the plan generating unit using the result data;
  generating a fourth processing instruction by the plan generating unit for updating a correspondence relation between a result of the natural join performed by executing the second processing instruction and a result of the cross join performed by executing the third processing instruction, based on these results;
  joining the first to fourth processing instructions by the plan generating unit, thereby generating the process plan;
  converting the first processing instruction included in the process plan into a fifth processing instruction, by the plan generating unit, for transmitting at least one acquisition request for the acquisition of all or part of the elements to the database servers, and receiving result data including the elements acquired according to the acquisition request from the database servers, respectively, the received result data having a header added, the header being for identifying a correspondence relation between the result data transmitted according to the acquisition request and the database server that transmits the result data; and
  executing the fifth processing instruction, receiving the result data from the database servers to aggregate the received result data in units of records, uniquely identifying the result data corresponding to the acquisition request and the database server that transmits the result data by using the header that is added to the result data, adding to each of the records of the result data an identifier that enables the database servers to uniquely identify the record, and storing resultant records in the storage unit as results of the execution of the fifth processing instruction.

* * * * *